US008913993B2

(12) United States Patent
Naiki et al.

(10) Patent No.: US 8,913,993 B2
(45) Date of Patent: Dec. 16, 2014

(54) TERMINAL APPARATUS WITH CONTROL UNIT TO CHANGE ACCURACY OF POSITION INFORMATION

(71) Applicant: Rohm Co., Ltd., Kyoto (JP)

(72) Inventors: Takashi Naiki, Kyoto (JP); Koki Okada, Kyoto (JP)

(73) Assignee: Rohm Co., Ltd. (JP)

( * ) Notice: Subject to any disclaimer, the term of this patent is extended or adjusted under 35 U.S.C. 154(b) by 109 days.

(21) Appl. No.: 13/678,815

(22) Filed: Nov. 16, 2012

(65) Prior Publication Data

US 2013/0171970 A1 Jul. 4, 2013

(30) Foreign Application Priority Data

Nov. 22, 2011 (JP) ................. 2011-255410

(51) Int. Cl.

| | |
|---|---|
| *H04M 1/66* | (2006.01) |
| *H04M 1/68* | (2006.01) |
| *H04M 3/16* | (2006.01) |
| *H04W 24/00* | (2009.01) |
| *H04W 4/02* | (2009.01) |
| *H04W 12/02* | (2009.01) |
| *H04W 24/02* | (2009.01) |

(52) U.S. Cl.
CPC .............. *H04W 12/02* (2013.01); *H04W 4/025* (2013.01); *H04W 24/02* (2013.01); *H04W 24/00* (2013.01)
USPC ........................................ 455/411; 455/456.1

(58) Field of Classification Search
USPC ................................................ 455/411, 456.1
See application file for complete search history.

(56) References Cited

U.S. PATENT DOCUMENTS

| | | | | |
|---|---|---|---|---|
| 6,813,499 | B2 * | 11/2004 | McDonnell et al. | 455/456.1 |
| 2003/0078053 | A1 * | 4/2003 | Abtin et al. | 455/456 |
| 2004/0132428 | A1 * | 7/2004 | Mulligan | 455/411 |
| 2008/0076450 | A1 * | 3/2008 | Nanda et al. | 455/456.1 |
| 2012/0009897 | A1 * | 1/2012 | Kasad et al. | 455/411 |
| 2012/0276925 | A1 * | 11/2012 | Pitt | 455/456.2 |
| 2013/0012220 | A1 * | 1/2013 | Waris et al. | 455/450 |

FOREIGN PATENT DOCUMENTS

JP 2002-351927 A 12/2002

* cited by examiner

*Primary Examiner* — Nathan Mitchell
(74) *Attorney, Agent, or Firm* — Cantor Colburn LLP

(57) ABSTRACT

A terminal device has: a sensor unit which perform a measurement; a position detection unit which acquires information for specifying a position; a timing unit which acquires time information; a communication unit which communicates via a communication network; and a control unit. The control unit generates position information for indicating a position of the terminal device by the position detection unit. Besides, the control unit changes accuracy of the position information within a predetermined range, and generates information for transmission related with the changed position information, the time information gotten by the timing unit, and measurement information indicating a measurement result of the sensor unit. In addition, the control unit controls the communication unit so as to transmit the information for the transmission to an information processing device via a communication network.

26 Claims, 10 Drawing Sheets

TERMINAL APPARATUS WITH CONTROL UNIT TO CHANGE ACCURACY OF POSITION INFORMATION

CROSS-REFERENCE TO RELATED APPLICATIONS

The present invention claims priority under 35 U.S.C. §119 to Japanese Application No. 2011-255410 filed Nov. 22, 2011, the entire content of which is incorporated herein by reference.

BACKGROUND OF THE INVENTION

1. Field of the Invention

The present disclosure relates to a terminal device having an information correction function, and an information processing system including the terminal device.

2. Description of Related Art

In recent years, a terminal unit represented by cellar phones, lap top computers and the like improves its performance and is multi-functionalized remarkably, especially the terminal device including a position detection function for detecting a current position of a device itself or a sensor function (e.g. a thermometer and an illuminometer) for measuring the surrounding environment of a device itself are put to practical use.

As a large-scale system to collect information and utilize the information from various kinds of these terminal devices, a cloud computing system (e.g. Pass-platform as a Service) which collects large-volume data called big data or formless information of high real-time property to be utilized for various purposes is proposed.

Here, as a conventional technology related to the above description, there is Japanese Patent application No. 2002-351927.

However, there are various problems in the above disclosed technology because various kinds of information is collected from many and unspecified terminals. In particular, there are problems of privacy related to the protection of personal information.

SUMMARY OF THE INVENTION

In light of the above problem found by the inventor of the present application, it is an object of the present invention to provide a terminal device and an information processing system in order to solve the above problem (in particular, to realize information collection with consideration to the protection of the privacy).

To achieve the above object, a terminal device disclosed in the present specification, the terminal device connected to a communication network, has a sensor unit which perform a measurement; a position detection unit which acquires information for specifying a position; a timing unit which acquires time information; a communication unit which communicates via the communication network; and a control unit which controls the communication unit so as to generate position information for indicating a position of the terminal device by the position detection unit, change accuracy of the position information within a predetermined range, generate information for transmission related with the changed position information and the time information gotten by the timing unit and measurement information indicating a measurement result of the sensor unit, and transmit the information for the transmission.

Here, other features, elements, steps, advantages and characteristics of the present invention will become more apparent from the following detailed description of preferred embodiments of the present invention and the attached drawings.

DETAILED DESCRIPTION OF PREFERRED EMBODIMENTS

<Information Processing System>

Figure 1:
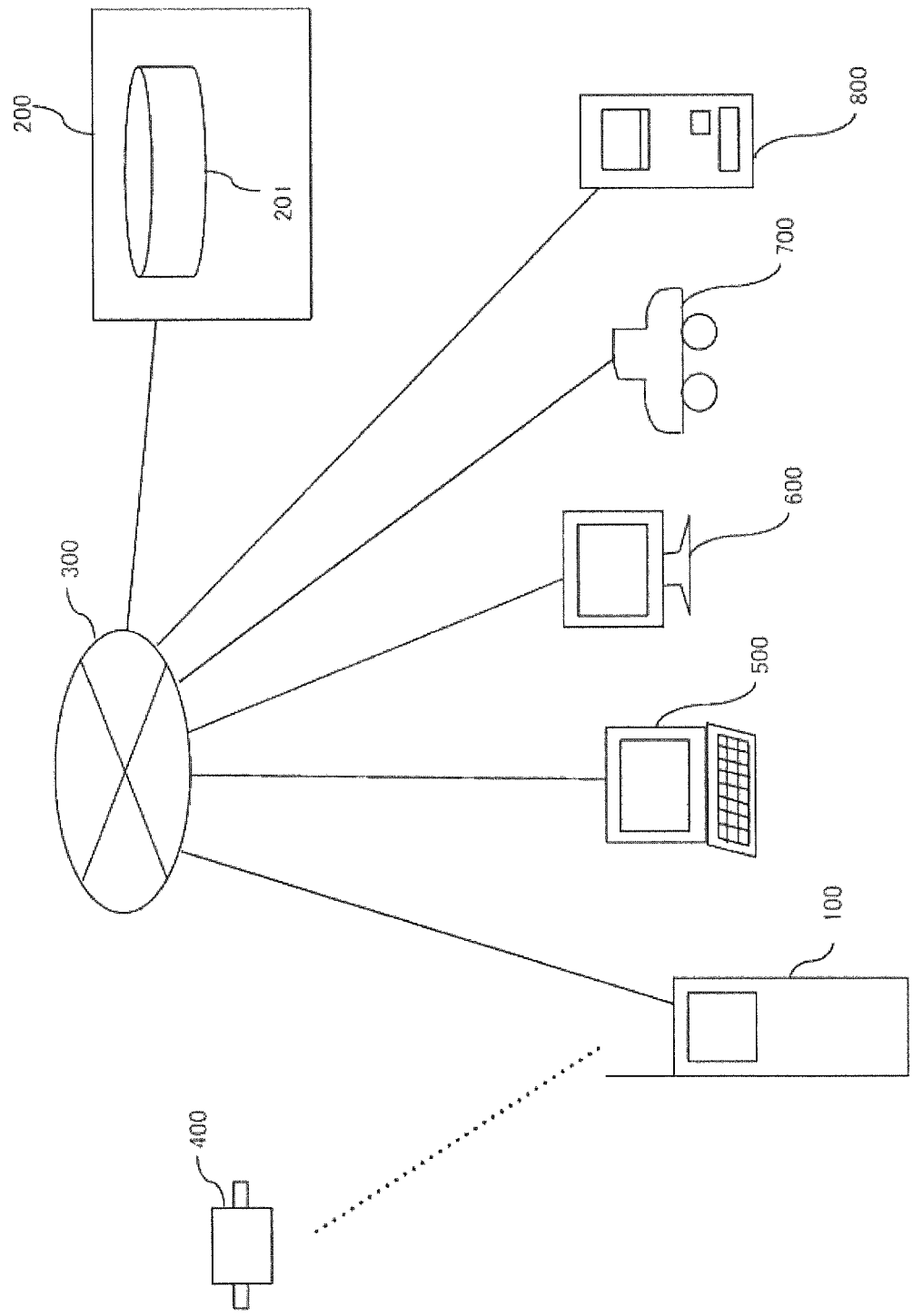
[FIG. 1] is a system configuration view for showing an information processing system of the present invention.

[FIG. 1] is a diagram for showing a structural example of an information processing system of the present invention. An information processing system in the present structural example includes: a cellular phone 100 (terminal device); an information processing server 200 (information processing device); a wide area network 300 (communication network); a GPS [global positioning system] satellite 400; a laptop computer 500 (terminal device); a television device 600 (terminal device); a car 700 (Terminal device); and a vending machine 800 (terminal device).

The cellular phone 100 has a wireless communication unit for communication by a wireless communication system of W-CDMA [wideband code division multiple access] and the like, for example. Thus, the cellular phone 100 communicates with a base station (not shown) via a wireless communication line, and it is possible to perform a voice call between telephone devices.

Besides, the cellular phone 100 can be connected with the wide area network 300 via the base station and the like. Thus, an owner of cellular phone 100 can implement various kinds of information communication such as browsing of websites and sending/receiving of e-mails by using applications such as browser applications and e-mail applications built into the cellular phone 100.

Besides, the cellular phone 100 has a position detection unit to perform the communication by a wireless communication system of a spread spectrum system and the like, for example. Thus, the cellular phone 100 communicates with a GPS satellite 400 via a satellite communication line. Then, the cellular phone 100 acquires variety kinds of information for calculating position information such as coordinate information of GPS satellite 400 and time information for measuring propagation time of a radio wave by a GPS satellite 400.

An information processing server 200 receives predetermined information from the terminal device (in the examples shown in FIG. 1, a cellular phone 100, a laptop computer 500, a television device 600, a car 700 and a vending machine 800) connected via a wide area network 300 to perform record/control by using a database 201. The position information of the terminal device, the measurement information acquired by a sensor of the terminal device, the time information indicating the time when the information is acquired and the like are given as the determined information.

Besides, the information processing server 200 has a function for analyzing and processing the collected information, taking statistics of the information, and distributing the information to the predetermined terminal device. Here, it should be understood that identification information (MAC [media access control] address, terminal ID or the like) for the information processing server 200 to specify the terminal device are registered to the information processing server 200 in advance, if possible.

Besides, the information processing server 200 may be formed by having a function for controlling an operation of the terminal device or the terminal device to collect management information and the like of the terminal device by sending a predetermined command signal to the terminal device.

The wide area network 300 includes the internet, a cellular phone communication network, a road transportation system, a private line for an enterprise and so on, as examples. Besides, the wide area network 300 may be in the form that includes a private communication network used by a public institution such as an educational institution or a medical institution, a wireless LAN [local area network] provided at public facilities, and the like.

The laptop computer 500, the television device 600, the car 700 and the vending machine 800 are the terminal devices that are connected with the wide area network 300 by wireless communication or wire communication. The terminal devices have, at least, an information detection unit which acquires information for specifying a position of the device itself, a sensor unit which measures the surrounding environment, and a timer unit which acquires the time information.

<Terminal Device>

Figure 2:
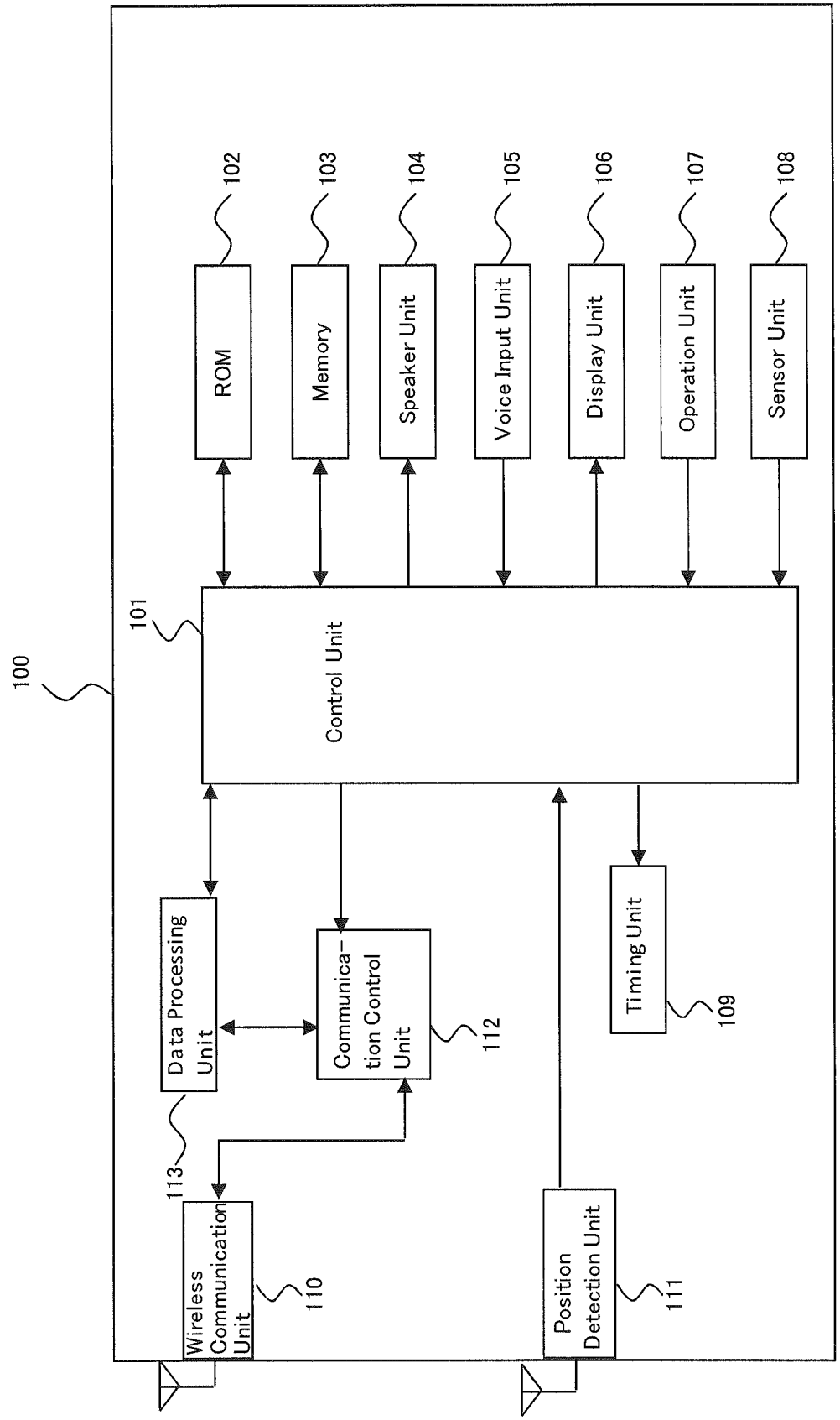
[FIG. 2] is a block diagram for showing an internal structure of a terminal device of the present invention.

FIG. 2 is a diagram for showing a structural example of the cellular phone 100 which is one of the terminal devices included in the information processing system of the present invention. The cellular phone 100 of the structural example is structured so as to include a control unit 101, a ROM [read only memory] 102, a memory 103, speaker unit 104, a voice input unit 105, a display unit 106, an operation unit 107, a sensor unit 108, a timing unit 109, a wireless communication unit 110 (communication unit), a position detection unit 111, a communication control unit 112 (communication unit), and a data processing unit 113. Here, the explanation is omitted here about the internal structure of the laptop computer 500, the television device 600, the car 700 and the vending machine 800 which is similarly the terminal unit.

The control unit 101 is a logic block for performing arithmetic processing of the information. The control unit 101 controls operation of each part of the cellular phone 100 in unification. Besides, the control unit 101 has a register for temporarily recording the information therein. Here, the details of variety kinds of processing which the control unit 101 carries out are described later.

The ROM 102 is a non-volatile semiconductor memory which records system programs executed by the control unit 101 and logic data and the like indicating set value for setting the operation of each part of the cellular phone 100. Here, in the ROM 102 of the present embodiments, application programs are also recorded in order for the control unit 101 to perform information acquisition processing by using the sensor unit 108.

The memory 103 is a readable/writable recording medium which temporarily records the processing information while the control unit 101 performs the variety kinds of processing. The memory 103 records, for example, contents of user operation which the operation unit 107 detects, and various kinds of settings which are set up based on the user operation.

The speaker unit 104 perform D/A [digital-to-analog] conversion obtained from the control unit 101, and outputs a voice based on a voice signal obtained by the conversion. The voice input unit 105 generates the voice signal from the voice obtained from a microphone (not shown), and besides, converts the voice signal into voice information by A/D [analog-to-analog] conversion to provide the voice information with the control unit 101.

The display unit 106 includes a display device such as a liquid crystal display and a driver unit. The driver unit decodes image information to apply a drive voltage to each of pixel electrodes of the display device. Thus, the display device displays an image in accordance with the applied drive voltage.

The operation unit 107 is an element for an owner of the cellular phone 100 to input various kinds of instructions such as outgoing call instructions and e-mail creation instructions to the cellular phone 100. The operation unit 107 is structured so as to include, for example, multiple buttons or touch panel or the like. The instructions sent by the operation unit 107 are given to the control unit 101, and the control unit 101 performs various kinds of control processing based on the instructions.

The sensor unit 108 is arranged for measuring the surrounding environment of the cellular phone 100 and biological information of the owner of the cellular phone 100. The sensor unit 108 includes at least one of a sensor unit. The sensor unit 108 includes a sensor unit related with a meteorological change or an environmental change such as a temperature sensor, an ambient light sensor, an ultraviolet sensor, an air pressure sensor, a humidity sensor, and a rain sensor. Alternatively, the sensor unit 108 includes a sensor device for detecting an object (including a moving object) such as an infrared sensor and an ultrasonic sensor. Alternatively, the sensor unit 108 includes a sensor related with a phenomenon which a human being is difficult to perceive such as a geomagnetic sensor and a radiation sensor. Alternatively, the sensor unit 108 includes a sensor related with acquisition of the biological information such as a pulse sensor, a fingerprint sensor, and a body temperature sensor. Alternatively, the sensor unit 108 includes a sensor related with the operation of the device itself such as an acceleration sensor and an angular velocity sensor. A sensor value (measurement information) acquired by the sensor unit 108 is provided with the control unit 101, and is used for generation of log information (information for transmission) described later.

Here, the sensor device included in the sensor unit 108 changes the position and the method provided with the terminal device in accordance with classification of the sensor device. For example, when the temperature sensor is provided with laptop computer 500, the temperature sensor is installed in an air inlet. Besides, when the ultraviolet ray sensor is provided with laptop computer 500, the ultraviolet ray sensor is mounted behind the display. For this reason, the surrounding environment of the laptop computer 500 such as the temperature and the ambient light is able to be measured more correctly.

The timing unit 109 is a circuit for always measuring the present time. The timing unit 109 performs the timing by using a crystal oscillator for outputting a predetermined oscillating frequency, for example. Besides, the timing unit 109 has a function for generating an almanac such as a date and a day of the week in addition to the present time.

The wireless communication unit 110 is a communication device for performing the wireless communication with the wide area network 300 via the wireless communication line, and is structured so as to include an antenna, an amplifier circuit, and a demodulator circuit, etc.

The position detection unit 111 acquires various kinds of information which is used in order to specify the current position of the cellular phone 100. The position detection unit 111 includes, for example, a GPS antenna which is a receiver for receiving a specific electric wave emitted from the GPS Satellite 400, and a decoder which decodes a signal received by the GPS antenna. Besides, the position detection unit 111 may be formed so as to have the acceleration sensor, the geomagnetic sensor, a gyroscope or the like as an auxiliary device. The various kinds of information acquired by the position detection unit 111 are provided with the control unit 101, and are used in order to identify the current position. Here, a position and a method for installing the acceleration sensor and the GPS antenna are appropriately changed by a structure and a use of the terminal device.

The communication control unit 112 controls the wireless communication unit 110 to mutually communicate with various kinds of devices (e.g. the information processing server 200) connected with the communication network. Besides, the communication control unit 112 performs various kinds of control related with information transmission using TCP/IP or the like as communications protocol, such as error correction and retransmission control.

The data processing unit 113 performs predetermined transform processing to an information signal obtained by the communication control unit 112 and generates the information on a common format that can be processed by each part of the cellular phone 100. Thus, voice information of a WAV format or image information of a JPEG format is generated, for example.

Besides, the data processing unit 113 performs predetermined transform processing to the information for the transmission sent from each part of the cellular phone 100 and generates the information signal that can be processed by the communication control unit 112. Thus, it is possible to perform the processing for sending/receiving of e-mails, the processing for browsing of the websites by the browser applications, or processing for the voice call, for example.

<Control Unit>

The processing which the control unit 101 which is one of the embodiments of the present invention performs is explained by using FIG. 1 and FIG. 2. Here, "device itself" used by the following explanation is the terminal unit which has the control unit 101, and the cellular phone 100 is assumed in the present embodiment. Since the laptop computer 500, the television device 600, the car 700 and the vending machine 800 in FIG. 1 are also the terminal devices which have the control unit 101, it is also possible to perform similar processing in these devices.

The control unit 101 performs position information calculation processing to calculate the position information of the device itself using various kinds of information obtained by the position detection unit 111. Specifically, latitude and longitude of the device itself are calculated, for example, by the coordinate information on the GPS Satellite 400 sent from the GPS Satellite 400 or by the time information for measuring the propagation time of the radio wave, and the position information is calculated.

Alternatively, the control unit 101 may be formed so as to specify the rough current position of the device itself from the identification information of the base station, an access point or the like which is used for the connection by connecting the device itself with the wide area network 300 using the wireless communication unit 110.

Alternatively, the control unit 101 may be formed so as to specify the rough current position of the device itself from the identification information of an installation ID or the like assigned to the device itself in advance when the device itself is a fixed installation type of device like the vending machine 800.

Alternatively, the control unit 101 may be formed so as to specify the rough current position of the device itself from the identification information installed to the device itself by a user in advance (for example, zip code information of an installation location that is entered by the user in order to automatically perform optimal tuner setting (setting of receiving stations or channels) in accordance with the area in which the device itself is installed) when the device itself is the fixed installation type of device like the television device 600.

As the above description, it is not always necessary that the position detection unit 111 which acquires the information for specifying the position of the device itself is installed as hardware including the GPS antenna, etc. For example, it is possible to be installed as software executed by the control unit 101 as well.

For example, it is possible to display on the screen of the display unit 106 the position information which is calculated by the control unit 101 or to send the position information to the information processing server 200 by the communication control unit 112. Besides, it is possible to watch the position of the device itself from the information processing server 200, and to use the position information for crime prevention, etc. by transmitting the position information to the information processing server 200 periodically.

Besides, the control unit 101 records the log of predetermined sensor values (RAW data) obtained by the sensor unit 108 as the log information continuously, at predetermined intervals, or every predetermined trigger. For example, a CSV [comma separated values] format is used as a data format of the log information. The log information includes the sensor values indicating the temperature or the ambient light, for example.

The control unit 101 always includes the various kinds of information obtained by the position detection unit 111 (or the position information calculated by the various kinds of information) and the time information (a time stamp) obtained by the timing unit 109 on one record of the generated log information.

It is possible to include an acquisition type, attribute information of acquisition terminals or acquirers, confidentiality of the information, or the like in the log information as an option. Here, the acquisition type is used for classification of information, selection of the information at the time of information provision, and so on. Besides, the confidentiality of the information shows whether the information presumes public disclosure. The information without the confidentiality may be able to be used as valuable information.

However, the position information can select system of regarding an area grid (an area divided by the predetermined method) as a unit because disclosure of personal information may be led. Thus, ambiguity of the current position of the device itself, that is, accuracy is made variable from a large level to a small level. Specifically, all predetermined low-order bits of the latitude and the longitude obtained by the communication with the GPS satellite 400 are set to 0. Thus, it is possible to reduce the accuracy of the position information and to increase the ambiguity.

The position information or the time information including in the log information performs the processing for reducing the accuracy of the information and increasing the ambiguity (hereinafter, referred to as "rounding") inside the device itself until the position information or the time information is uploaded via the wide area network 300. Thus, it is possible to protect the personal information and to reduce the processing by the information processing server 200.

The area grid which is used for the rounding of the position information is mainly assumed to be set up and specified based on the latitude and the longitude acquired by the communication with GPS satellite 400. However, the area grid may be specified by the node in LAN [local area network] or may be changed and extended by the latitude and the longitude linked with the node as the other system in case of indoors. More specifically, the area grid is specified by PCID, Wi-Fi (registered trademark), MAC, or the like.

The log information can set up an acquisition frequency. For example, the log information is changed in accordance with a network state. More specifically, it is possible to set up an acquisition interval by a width between several times and several hours. Thus, for example, the acquisition frequency is raised in accordance with requests from contractors of service, or is lowered when traffic is crowded.

Timing for sending the log information is not always the necessity of real-time transmission. For example, the number of people which passed through the front of the vending machine 800 is detected with the sensor device of the vending machine 800, and is sent as the log information. In this case, every predetermined period (e.g. 24 hours), the control unit 101 may be formed so as to send the log information indicating a total of the number of people detected during the period.

Here, in the log information, the information about the sensor device that is not equipped with the terminal device for the information acquisition is NULL in case of uploads. Accordingly, the terminal device is not necessary to equip all of the sensor devices. Here, it is advisable that the acquired log information is such a variable-length type as grants certainly the identification information which shows the information classification, size, etc. Thus, for example, when a new sensor device is added to sensor unit 108, it is possible to additionally upload the information acquired by the new sensor device.

Besides, the control unit 101 may be formed so as to include the identification information showing the type of information in the record or the log information, by prescribing combination patterns of several kinds of information in advance. Thus, it is possible to suppress the amount of information in a single transmission.

Besides, the control unit 101 may be formed so as to start up automatically by receiving the predetermined command sent from the network (e.g. wide area network 300) by the communication control unit 112 and acquire the data by sensor unit 108. For example, this is performed using the technology of Wake on LAN.

Besides, the control unit 101 may be formed so as to always operate the sensor unit 108 and start up automatically when a measurement result by the sensor unit 108 corresponds with a predetermined condition in order to start the transmission of the log information etc. For example, this is performed using the technology of Wake on Sensor. Here, if the Wake on Sensor is used, it is advisable to install a device for starting up automatically, quickly and certainly when the sensor unit 108 is mounted on the hardware.

Besides, in actual operation, a structure which can distinguish free information from pay information to distribute the free information and the pay information is used as the contents which should be examined when starting the service of the information correction/distribution. For example, the information according to contract form is distributed by presenting a plurality of the contract form to people who receive the service. In particularly, the pay information is securely distributed by encryption and so on. As to the pay information, the structure in which a provider (an owner of the terminal unit who provides the log information) can sell the information, such as billing system, is built.

As to the distribution of the information, the value of the information is evaluated by the amount of information, the classification of the information, the frequency of the distribution, a specific condition (e.g. a type of device), or the like. Besides, the value of the information dynamically changes in accordance with sales of the information. For example, a smartphone, a personal computer, an IC tag and a stationary device are given as the type of device.

Accordingly, the present invention is directed to the device or the system connected to the network in any way like the cellular phone 100, the laptop computer 500, or the installed personal computer (not shown). However, if the terminal device with performance equivalent to the above-mentioned devices, for example, infrastructures such as household appliances with a built-in sensor, transportation, public facilities, electric power, and public telephones has at least one of the measurement method, the position information acquisition method, and the communication method that become the object of them, it becomes a terminal device for the information acquisition.

In order to execute the above-mentioned information acquisition/distribution system (information processing system), a necessary structure is summarized below. However, the necessary structure is not limited below, and it is desirable to be adapted to local technology, for example.

Firstly, the area grid system which rounds to the level according to sender's mind as of uploading the acquired position information is employed. Thus, it is possible to protect the personal information.

Secondly, the measurement information, the position information, and the time information is one record in a set.

Thirdly, the time information can be also rounded according to sender's request before the upload. Specifically, the time information is generated by the hour by deleting the value about seconds and minutes from the time information.

Fourthly, the sender can decide setting ranges to the device itself as to the acquisition frequency of the various kinds of information such as the measurement information. This is for reduction of power consumption, or security protection. Besides, the change of the acquisition frequency is permitted to a change request from the host (information processing server 200) within the above-mentioned setting ranges.

Fifthly, when service users acquire from the host the log information collected to the host (in addition, the various kinds of information generated by the log information), the service users can instruct the change of the contents of the acquired information or the change of the acquired method. For example, it is possible to instruct in accordance with a terminal device attribute used for the log information collection, a holder's attribute (owner of the above-mentioned terminal device), acquirable information classification, a range of the values of the acquired information, and the setting range of an acquirable frequency after grouping is carried out.

Thus, it is possible to acquire only the log information acquired from the terminal device which an age group of 20s and 30s has, to acquire only the log information with the measurement precision more than the predetermined precision, and to acquire only the log information acquired by the frequency more than the predetermined frequency.

Alternatively, the host picks out only the log information related to specific fields (e.g. medical treatment and nursing care), and carries out analysis, processing, statistics, and management of the log information, and then may generate and distribute the information specialized in the said field. Thus, useful information can be offered to the companies etc. which make the said field business.

According to the present embodiments explained above, the terminal device and the information processing system which achieve the protection of the personal information appropriately can be offered in the information processing system which collects large-volume data and formless information of high real-time property via the wide area network.

Besides, according to the present embodiments, service users which use the log information collected by the terminal device via the information processing system can use necessary information more efficiently.

<Privacy Protection Technology>

As the above description, it is necessary to fully pay attention about users' privacy protection when uploading the log information from the terminal device to the server. In particular, it is advisable for users to be formed so as to be able to set an upper limit value of the resolution arbitrarily because the position information offered from the terminal device to the server is the personal information related to the privacy of the users closely. With such the structure, confidentiality of the position information is not left only to a security function of the server, but before outputting the log information from the terminal device, the accuracy of position information can be beforehand reduced by the terminal device. Accordingly, even if a leak of the information from the server should arise, it is possible to minimize users' damage.

Figure 3:
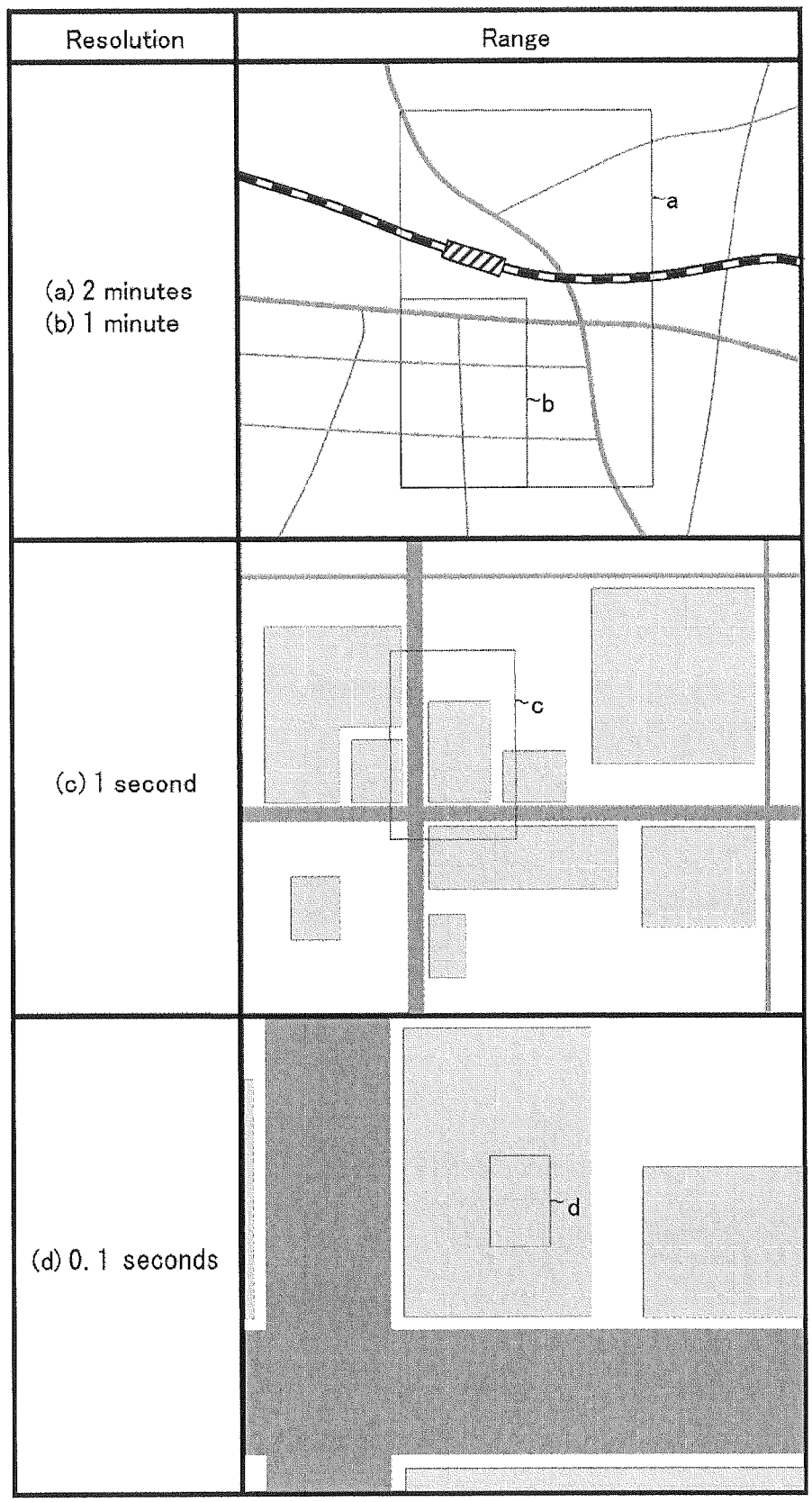
[FIG. 3] is a schematic diagram for showing a relation between resolution of position information and a range on a map.

FIG. 3 is a schematic diagram for showing a relation between resolution of position information and a range on a map. For example, the position information acquired by the terminal device is offered to the server after each of the latitude and the longitude is changed at intervals of 2 minutes when the upper limit value of the resolution is set in 2 minutes. A location of the terminal device specified from such position information becomes within the range (For example, if it is in the vicinity of 35 degrees north latitude, it measures 3.6 km from south to north, and 2.4 km from east to west.) shown by the broken line (a).

When the upper limit value of the resolution is set in 1 minute, the position information acquired by the terminal device is offered to the server after each of the latitude and the longitude is changed at intervals of 1 minute. A location of the terminal device specified from such position information becomes within the range (For example, if it is in the vicinity of 35 degrees north latitude, it measures 1.8 km from south to north, and 1.2 km from east to west.) shown by the broken line (b).

When the upper limit value of the resolution is set in 1 second, the position information acquired by the terminal device is offered to the server after each of the latitude and the longitude is changed at intervals of 1 second. A location of the terminal device specified from such position information becomes within the range (For example, if it is in the vicinity of 35 degrees north latitude, it measures 30.9 m from south to north, and 25.3 m from east to west.) shown by the broken line (c).

When the upper limit value of the resolution is set in 0.1 second, the position information acquired by the terminal device is offered to the server after each of the latitude and the longitude is changed at intervals of 0.1 second. A location of the terminal device specified from such position information becomes within the range (For example, if it is in the vicinity of 35 degrees north latitude, it measures 3.1 m from south to north, and 2.5 m from east to west.) shown by the broken line (d).

As described above, if the users can set the upper limit value of the resolution arbitrarily about the position information offered from the terminal device to the server, the users can offer the position information of the terminal device to the server within the range which the users judge to be suitable by weighing the protection of the privacy with collateral to the offer of the position information (expansion of information service, point grant, etc.).

Figure 4:
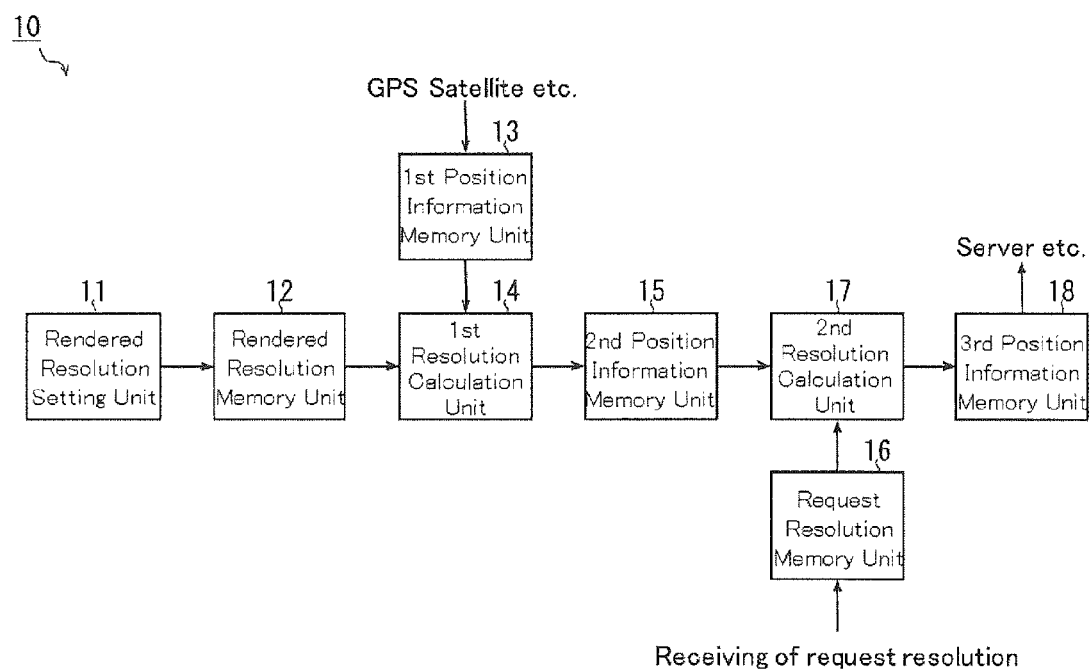
[FIG. 4] is a block diagram for showing a first structural example of a privacy protection unit.

FIG. 4 is a block diagram for showing a first structural example of a privacy protection unit mounted on the terminal device. The privacy protection unit 10 of the first structural example is a functional block corresponding to the above-mentioned control unit 101 (see FIG. 2), and includes a rendered resolution setting unit 11, a rendered resolution memory unit 12, a first position information memory unit 13, a first resolution calculation unit 14, a second position information memory unit 15, a request resolution memory unit 16, a second resolution calculation unit 17, and a third position information memory unit 18.

The rendered resolution setting unit 11 accepts the setting of the rendered resolution from the users (corresponding to the upper value of the resolution) as to the position information offered from the terminal device to the server. Accordingly, the position information of the resolution lower than the rendered resolution which is set by the rendered resolution setting unit 11 is treated as though the offer to the server is acknowledged by the users. Here, an existing input device such as a keyboard, a touch panel, etc. (corresponding to the operation unit 107 in FIG. 2) can be used as the rendered resolution setting unit 11.

The rendered resolution memory unit 12 is a register which memorizes the rendered resolution set up in the rendered resolution setting unit 11.

The first position information memory unit 13 is a register which memorizes first position information (position information of the highest resolution) obtained by the position detection unit 111 (see FIG. 2).

The first resolution calculation unit 14 changes the resolution of the first position information which is read out from the first position information memory unit 13 into the rendered resolution which is read out from the rendered resolution memory unit 12 to generate second position information. For example, when the rendered resolution is set in "1 minute", the second position information is shown as "latitude aa degrees bb minutes 0 second north, longitude ddd degrees ee minutes 0 second east" at intervals of 1 second if the first position information is "latitude aa degrees bb minutes cc.c seconds north, longitude ddd degrees ee minutes ff.f seconds east" at the intervals of 0.1 seconds.

The second position information memory unit 15 is a register which memorizes the second position information generated by the first resolution calculation unit 14.

The request resolution memory unit 16 is a register which memorizes the request resolution required from outside the device. Here, the above-mentioned request resolution is set high if it is necessary to grasp in detail the position information of the terminal device on the server. To the contrary, the above-mentioned request resolution is set low if it is necessary to limit traffic on the server.

The second resolution calculation unit 17 changes the resolution of the second position information which is read out from the second position information memory unit into the request resolution which is read out from the request resolution memory unit 16 to generate third position information. Here, when the request resolution is set as the resolution lower than the rendered resolution (e.g. "2 minutes"), the third position information is generated in accordance with the request resolution. When the request resolution is set as the resolution higher than the rendered resolution (e.g. "6 seconds"), the second position information in accordance with the rendered resolution is outputted as the third position information without depending on the request resolution as it is. That is to say, the third position information is assumed that the resolution of the first position information is changed by selecting the lower of either the rendered resolution or the request resolution as the upper limit value.

The third position information memory unit 18 is a register which memorizes the third position information generated by the second resolution calculation unit 17. This third position information is offered to the server.

It is possible to offer the information from the terminal device to the server while considering the users' privacy protection by using such a privacy protection unit 10.

Figure 5:
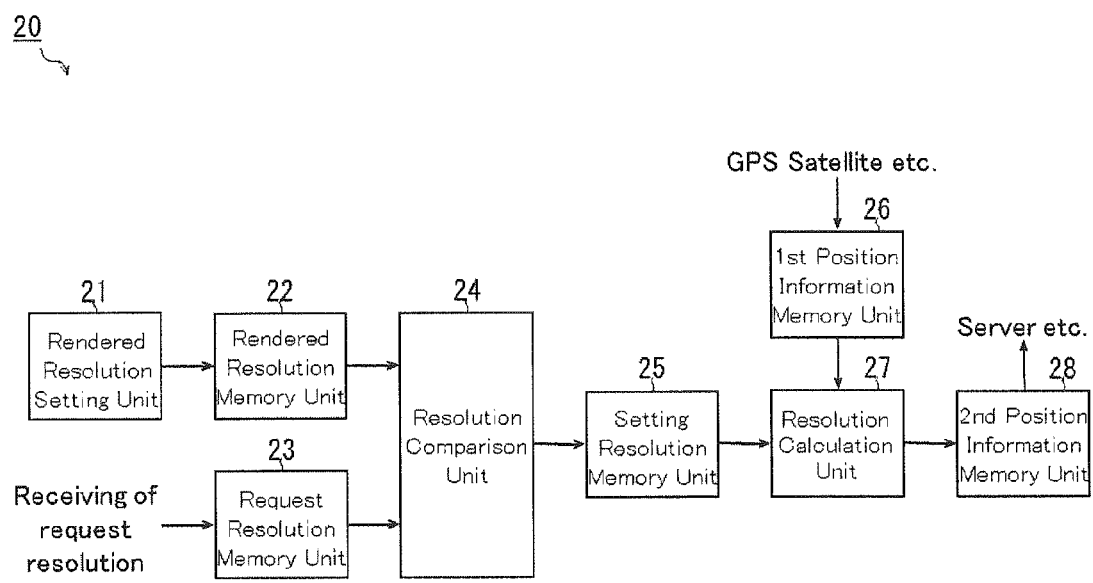
[FIG. 5] is a block diagram for showing a second structural example of a privacy protection unit.

FIG. 5 is a block diagram for showing a second structural example of a privacy protection unit mounted on the terminal device. The privacy protection unit 20 of the second structural example is a functional block corresponding to the above-mentioned control unit 101 (see FIG. 2), and includes a rendered resolution setting unit 21, a rendered resolution memory unit 22, a request resolution memory unit 23, a resolution comparison unit 24, a setting resolution memory unit 25, a first position information memory unit 26, a resolution calculation unit 27, and a second position information memory unit 28.

The rendered resolution setting unit 21 accepts the setting of the rendered resolution from the users (corresponding to the upper value of the resolution) as to the position information offered from the terminal device to the server. Accordingly, the position information of the resolution lower than the rendered resolution which is set by the rendered resolution setting unit 21 is treated as though the offer to the server is acknowledged by the users. Here, an existing input device such as a keyboard, a touch panel, etc. (corresponding to the operation unit 107 in FIG. 2) can be used as the rendered resolution setting unit 21.

The rendered resolution memory unit 22 is a register which memorizes the rendered resolution set by the rendered solution setting unit 21.

The request resolution memory unit 23 is a register which memorizes the request resolution required from outside the device. Here, the above-mentioned request resolution is set high if it is necessary to grasp in detail the position information of the terminal device on the server. To the contrary, the above-mentioned request resolution is set low if it is necessary to limit traffic on the server.

The resolution comparison unit 24 compares the rendered resolution which is read out from the rendered resolution memory unit 22 with the request resolution which is read out from the request resolution memory unit 23.

The setting resolution memory unit 25 is a register which memorizes the lower of either the rendered resolution or the request resolution as the setting resolution, based on the comparison result of the resolution comparison 24. For example, if the rendered resolution and the request resolution are set as "1 minute" and "6 seconds" respectively, the setting resolution is set in "1 minute".

The first position information memory unit 26 is a register which memorizes the first position information (position information of the highest resolution) obtained by the position detection unit 111 (see FIG. 2).

The resolution calculation unit 27 changes the resolution of the first position information which is read out from the first position information memory unit 26 into the setting resolution which is read out from the setting resolution memory unit 25 to generate the second position information. For example, when the setting resolution is set in "1 minute", the second position information is shown as "latitude aa degrees bb minutes 0 second north, longitude ddd degrees ee minutes 0 second east" at intervals of 1 second if the first position information is "latitude aa degrees bb minutes cc.c seconds north, longitude ddd degrees ee minutes ff.f seconds east" at the intervals of 0.1 seconds.

The second position information memory unit 28 is a register which memorizes the second position information generated by the resolution calculation unit 27. This second position information is offered to the server.

By using such a privacy protection unit 20, it is possible to offer the information from the terminal device to the server while considering the users' privacy protection as well as the above-mentioned first structural example.

Here, in the above first and second structural examples, the structure is described as an example, in which the position information of the resolution higher than the rendered resolution set at the terminal device in order to protect the users' privacy doesn't be offered to the server, however, the structure of the privacy protection unit 10 and the privacy protection unit 20 is not limited to this, and a structure may be employed, in which the resolution of the position information is set to the request resolution to be offered to the server without depending on the rendered resolution set by the terminal device, only when a special request signal is accepted from states or the police. With such the structure, it is possible to give priority to specifying a location of the terminal device rather than protecting users' privacy, only when a special situation which requires urgency arises, like search for missing persons, pursuit of criminals, etc.

Figure 6:
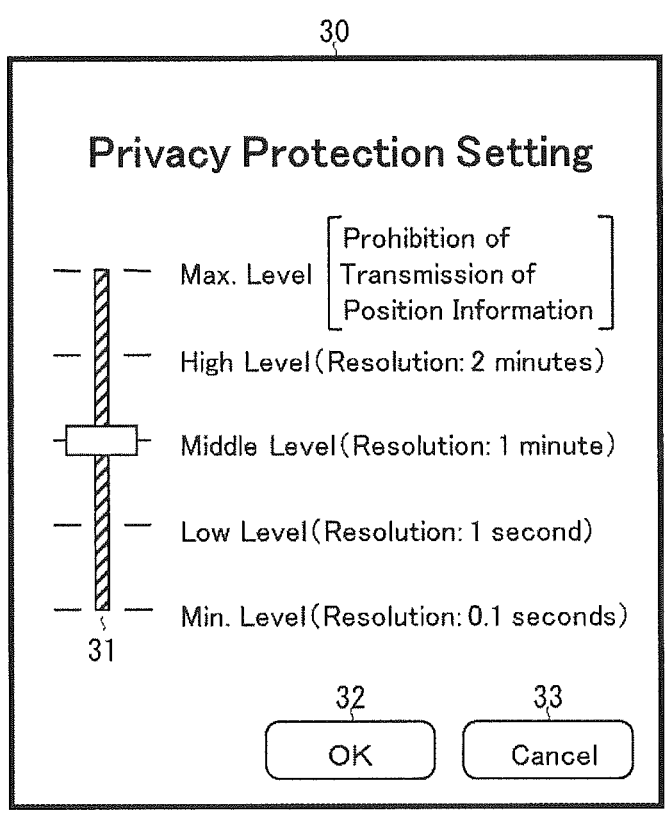
[FIG. 6] is a schematic diagram for showing an example of a setting screen related to privacy protection.
Figure 7:
[FIG. 7] is an appearance view of a terminal device (smartphone).
Figure 8:
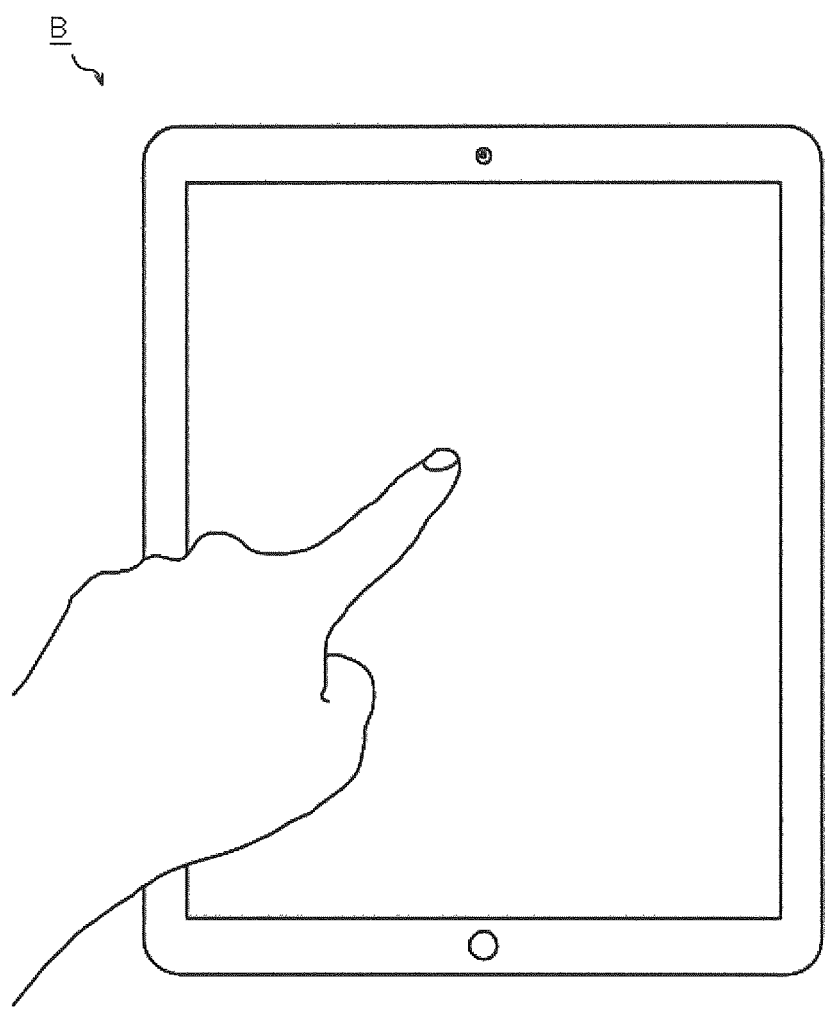
[FIG. 8] is an appearance view of a terminal device (tablet PC).
Figure 9:
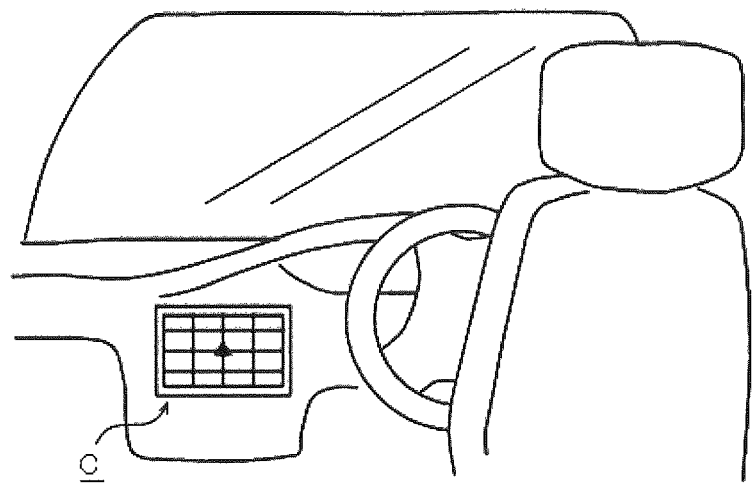
[FIG. 9] is an appearance view of a terminal device (automotive navigation system).
Figure 10:
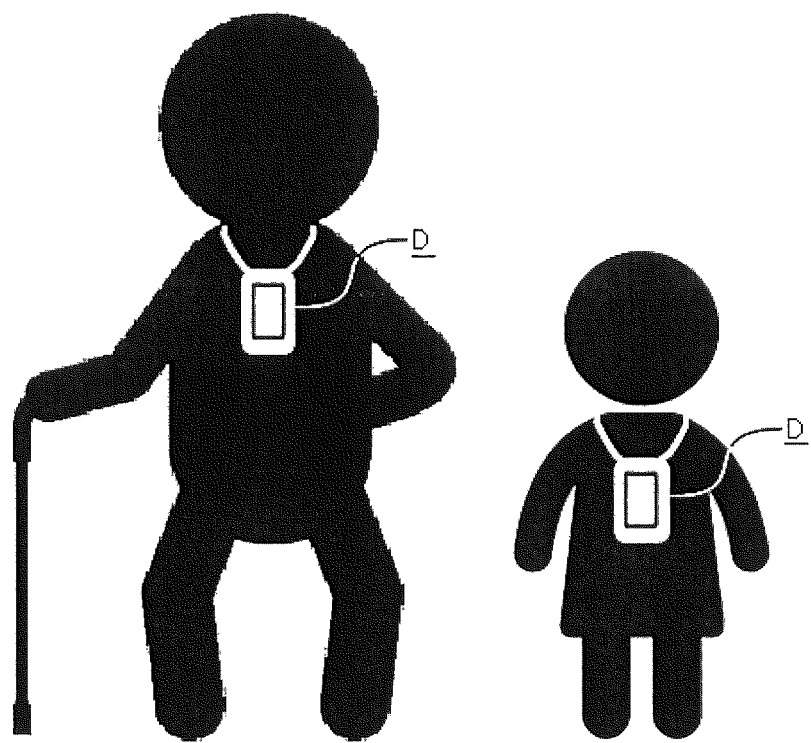
[FIG. 10] is an appearance view of a terminal device (monitoring sensor).

FIG. 6 is a schematic diagram for showing an example of a privacy protection setting screen. The privacy protection setting screen 30 of this embodiment includes a slider 31, an OK button 32, and a cancel button 33.

The slider 31 is a widget (GUI [graphical user interface] parts) which accepts change operation of a privacy protection level. In the example of FIG. 6, five privacy protection levels (Maximum/High/Middle/Low/Minimum) are prepared. The users can change the privacy protection level arbitrarily by moving the slider 31 up and down.

The OK button 32 is a widget which accepts completion operation of the privacy protection setting. If the OK button 32 is clicked or tapped, the privacy level which is set by the slider 31 at that time is reflected.

The cancel button 32 is a widget which accepts cancellation operation of the privacy protection setting. If the cancel button 32 is clicked or tapped, the privacy protection level which is set so far is maintained.

Though a block level of Cookie or validity/invalidity of a pop-up block is indicated in many cases as to the privacy protection level of the terminal device, it is advisable to set the rendered resolution of the position information (see FIG. 4 and FIG. 5) by being linked to the above-mentioned privacy protection level in the terminal device comprising a server transmission function.

As shown in FIG. 6, when the privacy protection level is set to the minimum level, low level, middle level, and high level, the rendered resolution of the position information is set to 0.1 seconds, 1 second, 1 minute, and 2 minutes by being linked to them. In addition, when the privacy protection level is set to the maximum level, it is advisable to be set so as to stop the offer of the position information to the server by being linked to this. With such the structure, the users can appropriately set the resolution of the position information that is offered to the server by intuitive operation. If the rendered resolution of the position information needs to be set closely, a detailed setting screen is prepared separately.

As a structure other than the above, instead of the structure that offers to the server the latitude/longitude of a point in which the terminal device is located as the position information, the structure may offer to the server an administrative district name to which a location point of the terminal device belongs as the position information. With such the structure, it is possible to fully protect the users' privacy because the position information which is offered to the server becomes the lower accuracy.

If the above-mentioned structure is adopted, it is advisable to offer to the server any of a municipality name, a country name or a prefecture name, a state name or a province name, and a nation name as the position information by being linked to the aforementioned privacy protection level. With such the structure, the users can appropriately set the administrative district name that is offered to the server by intuitive operation.

<Other Modifications>

Here, in addition to the above embodiments, it is possible to add various modifications to the structure of the present invention without departing from the spirit of the invention. In other words, it should be understood that the above embodiments are examples in all respects and are not limiting; the technological scope of the present invention is not indicated by the above description of the embodiments but by the claims; and all modifications within the scope of the claims and the meaning equivalent to the claims are covered.

Although the cellular phone 100, the laptop computer 500, the television device 600, the car 700, and the vending machine 800 is shown as an example in FIG. 1, the present invention may be performed by a terminal device other than them. As shown in FIG. 7 to FIG. 10, a smartphone A, a tablet B, an automotive navigation system C, and the monitoring sensor D may be used as the terminal device of the present invention. Although a figure is not shown, the present invention may be formed so as to be performed to the information processing device such as a portable game machine and a PDA [personal digital assistant]. Alternatively, the present invention may be formed so as to be performed to an imaging device such as a digital video camera and a digital still camera. If a communication function is included, the present invention may be formed so as to be performed to household appliances such as a refrigerator and a microwave oven, a road traffic apparatus, or a monitor for advertisement.

Industrial Applicability

The present invention is useful technology to achieve the suitable protection of the personal information in the information processing system including the terminal device such as a cellular phone, a personal computer, a mobile device, household appliances, and an installed device.

What is claimed is:

1. A terminal device comprising:
a sensor unit which perform a measurement;
a position detection unit which acquires information for specifying a position;
a timing unit which acquires time information;
a communication unit which communicates via a communication network; and
a control unit which controls the communication unit so as to:
generate position information for indicating a position of the terminal device by the position detection unit,
change accuracy of the position information within a predetermined range,
generate information for transmission related with the changed position information and the time information gotten by the timing unit and measurement information indicating a measurement result of the sensor unit,
record the information for the transmission,
reduce the accuracy of the information for the transmission inside the terminal device itself until the information for the transmission is uploaded via the communication network, and
upload the information for the transmission after the accuracy of the information for the transmission is reduced.

2. The terminal device according to claim 1, wherein the control unit accepts a assignment of the range to change the accuracy of the position information within the range of the assignment.

3. The terminal device according to claim 2, wherein the control unit changes the accuracy of the position information by lacking a part of the position information, or by being converted into the information which shows that a position of the terminal device is included in any of areas divided by a predetermined method.

4. The terminal device according to claim 3, wherein the control unit accepts the assignment the accuracy of the time information to change the accuracy of the time information based on the accuracy of the assignment.

5. The terminal device according to claim 4, wherein the control unit adds attribute information of the terminal device or attribute information of an owner of the terminal device to the information for the transmission.

6. The terminal device according to claim 5, wherein the control unit accepts the assignment about a measurement frequency where the sensor unit performs the measurement or about a measurement range which becomes a measurement object, and controls the sensor unit so as to perform the measurement based on the measurement frequency of the assignment or the measurement range.

7. The terminal device according to claim 6, wherein the control unit accepts the assignment about the measurement frequency or the measurement range by the communication unit via the communication network, and changes the measurement frequency or the measurement range within a predetermined range.

8. The terminal device according to claim 7, wherein the position detection unit includes any of a GPS [global positioning system], an acceleration sensor and an angular velocity sensor, and a geomagnetic sensor, and the sensor unit includes a device for measuring any of a ray, magnetism, heat, electricity, power, and sound.

9. The terminal device according to claim 1, wherein the control unit changes resolution of the position information into a predetermined upper limit, and offers the resolution thus changed to a server.

10. The terminal device according to claim 9, wherein the upper limit is the lower of either rendered resolution set by the terminal device or request resolution requested from outside the device.

11. The terminal device according to claim 10, wherein the control unit includes:
 a rendered resolution setting unit which accepts a setting of the rendered resolution;
 a rendered resolution memory unit which memorizes the rendered resolution;
 a first position information memory unit which memorizes a first position information obtained by the position detection unit;
 a first resolution calculation unit which changes the resolution of the first position information into the rendered resolution to generate second position information;
 a second position information memory unit which memorizes the second position information;
 a request resolution memory unit which memorizes the request resolution requested from outside the device;
 a second resolution calculation unit which changes the resolution of the second position information into the request resolution to generate third position information; and
 a third position information memory unit which memorizes the third position information,
 wherein the control unit which offers the third position information to the server.

12. The terminal device according to claim 10, wherein the control unit includes:
 a rendered resolution setting unit which accepts a setting of the rendered resolution;
 a rendered resolution memory unit which memorizes the rendered resolution;
 a request resolution memory unit which memorizes the request resolution requested from outside the device;
 a resolution comparison unit which compares the rendered resolution with the request resolution;
 a setting resolution memory unit which memorizes the lower of the rendered resolution or the request resolution as a setting resolution;
 a first position information memory unit which memorizes first position information obtained by the position detection unit;
 a resolution calculation unit changes the resolution of the first position information into the setting resolution to generate second position information; and
 a second position information memory unit which memorizes the second position information,
 wherein the control unit which offers the second position information to the server.

13. The terminal device according to claim 10, wherein the rendered resolution is set by being linked to a privacy protection level.

14. The terminal device according to claim 13, wherein the privacy protection level is set by operating a slider on a privacy protection setting screen.

15. The terminal device according to claim 10, wherein the control unit the resolution of the position information is set to the request resolution, and offer the resolution thus set to the server without depending on the rendered resolution, only when a special request signal is accepted.

16. The terminal device according to claim 1, wherein the control unit offers an administrative district name in which the terminal device is located as the position information to a server.

17. The terminal device according to claim 16, wherein the control unit offers to the server any of a municipality name, a country name or a prefecture name, a state name or a province name, and a nation name as the position information by being linked to a predetermined privacy protection level.

18. The terminal device according to claim 1, wherein the control unit stops an offer of the position information to a server when a predetermined privacy protection level is a maximum level.

19. A terminal device comprising:
 a sensor unit which perform a measurement;
 a position detection unit which acquires information for specifying a position;
 a timing unit which acquires time information;
 a communication unit which communicates via a communication network; and
 a control unit which controls the communication unit so as to generate position information for indicating a position of the terminal device by the position detection unit, change accuracy of the position information within a predetermined range, generate information for transmission related with the changed position information and the time information gotten by the timing unit and measurement information indicating a measurement result of the sensor unit, and transmit the information for the transmission;
 wherein the control unit accepts a assignment of the range to change the accuracy of the position information within the range of the assignment;
 the control unit changes the accuracy of the position information by lacking a part of the position information, or by being converted into the information which shows that a position of the terminal device is included in any of areas divided by a predetermined method; and
 the control unit accepts the assignment the accuracy of the time information to change the accuracy of the time information based on the accuracy of the assignment.

20. The terminal device according to claim 19, wherein the control unit adds attribute information of the terminal device or attribute information of an owner of the terminal device to the information for the transmission.

21. The terminal device according to claim 20, wherein the control unit accepts the assignment about a measurement frequency where the sensor unit performs the measurement or about a measurement range which becomes a measurement object, and controls the sensor unit so as to perform the measurement based on the measurement frequency of the assignment or the measurement range.

22. The terminal device according to claim 21, wherein the control unit accepts the assignment about the measurement frequency or the measurement range by the communication unit via the communication network, and changes the measurement frequency or the measurement range within a predetermined range.

23. The terminal device according to claim 22, wherein the position detection unit includes any of a GPS [global positioning system], an acceleration sensor and an angular velocity sensor, and a geomagnetic sensor, and the sensor unit includes a device for measuring any of a ray, magnetism, heat, electricity, power, and sound.

24. A terminal device comprising:
a sensor unit which perform a measurement;
a position detection unit which acquires information for specifying a position;
a timing unit which acquires time information;
a communication unit which communicates via a communication network; and
a control unit which controls the communication unit so as to generate position information for indicating a position of the terminal device by the position detection unit, change accuracy of the position information within a predetermined range, generate information for transmission related with the changed position information and the time information gotten by the timing unit and measurement information indicating a measurement result of the sensor unit, and transmit the information for the transmission;
wherein the control unit changes resolution of the position information into a predetermined upper limit, and offers the resolution thus changed to a server;
wherein the upper limit is the lower of either rendered resolution set by the terminal device or request resolution requested from outside the device;
wherein the control unit comprises:
a rendered resolution setting unit which accepts a setting of the rendered resolution;
a rendered resolution memory unit which memorizes the rendered resolution;
a first position information memory unit which memorizes a first position information obtained by the position detection unit;
a first resolution calculation unit which changes the resolution of the first position information into the rendered resolution to generate second position information;
a second position information memory unit which memorizes the second position information;
a request resolution memory unit which memorizes the request resolution requested from outside the device;
a second resolution calculation unit which changes the resolution of the second position information into the request resolution to generate third position information; and
a third position information memory unit which memorizes the third position information, wherein
the control unit offers the third position information to the server.

25. A terminal device comprising:
a sensor unit which perform a measurement;
a position detection unit which acquires information for specifying a position;
a timing unit which acquires time information;
a communication unit which communicates via a communication network; and
a control unit which controls the communication unit so as to generate position information for indicating a position of the terminal device by the position detection unit, change accuracy of the position information within a predetermined range, generate information for transmission related with the changed position information and the time information gotten by the timing unit and measurement information indicating a measurement result of the sensor unit, and transmit the information for the transmission;
wherein the control unit changes resolution of the position information into a predetermined upper limit, and offers the resolution thus changed to a server;
wherein the upper limit is the lower of either rendered resolution set by the terminal device or request resolution requested from outside the device;
the control unit includes:
a rendered resolution setting unit which accepts a setting of the rendered resolution;
a rendered resolution memory unit which memorizes the rendered resolution;
a request resolution memory unit which memorizes the request resolution requested from outside the device;
a resolution comparison unit which compares the rendered resolution with the request resolution;
a setting resolution memory unit which memorizes the lower of the rendered resolution or the request resolution as a setting resolution;
a first position information memory unit which memorizes first position information obtained by the position detection unit;
a resolution calculation unit changes the resolution of the first position information into the setting resolution to generate second position information; and
a second position information memory unit which memorizes the second position information, wherein
the control unit offers the second position information to the server.

26. A terminal device comprising:
a sensor unit which perform a measurement;
a position detection unit which acquires information for specifying a position;
a timing unit which acquires time information;
a communication unit which communicates via a communication network; and
a control unit which controls the communication unit so as to generate position information for indicating a position of the terminal device by the position detection unit, change accuracy of the position information within a predetermined range, generate information for transmission related with the changed position information and the time information gotten by the timing unit and measurement information indicating a measurement result of the sensor unit, and transmit the information for the transmission;
wherein the control unit changes resolution of the position information into a predetermined upper limit, and offers the resolution thus changed to a server;
wherein the upper limit is the lower of either rendered resolution set by the terminal device or request resolution requested from outside the device;
wherein the control unit the resolution of the position information is set to the request resolution, and offer the resolution thus set to the server without depending on the rendered resolution, only when a special request signal is accepted.

* * * * *